No. 894,562. PATENTED JULY 28, 1908.
O. WOOTEN.
HAY WAGON BRAKE.
APPLICATION FILED AUG. 6, 1907.

2 SHEETS—SHEET 1.

Attest.
Edgar T. Farmer.
N. P. Smith

Inventor:
Owen Wooten.
By Higdon Lougan
Attys

No. 894,562. PATENTED JULY 28, 1908.
O. WOOTEN.
HAY WAGON BRAKE.
APPLICATION FILED AUG. 6, 1907.
2 SHEETS—SHEET 2.
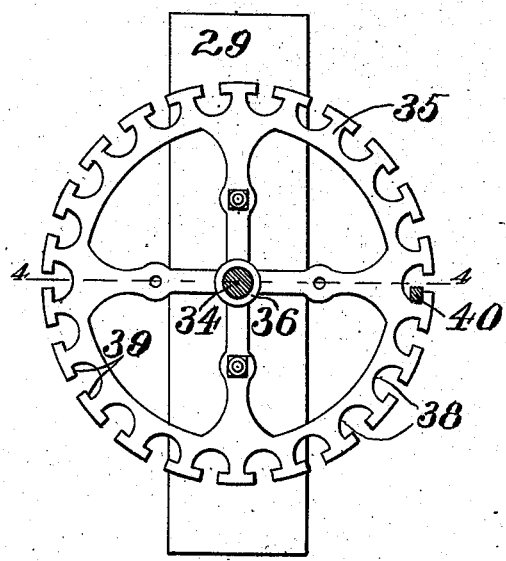
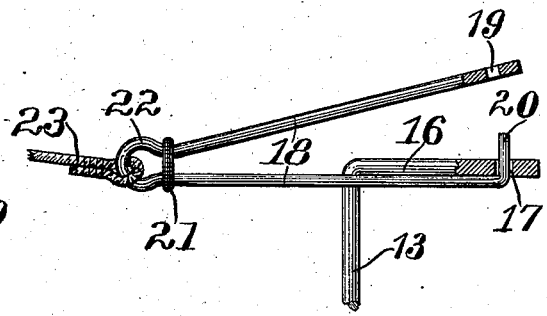
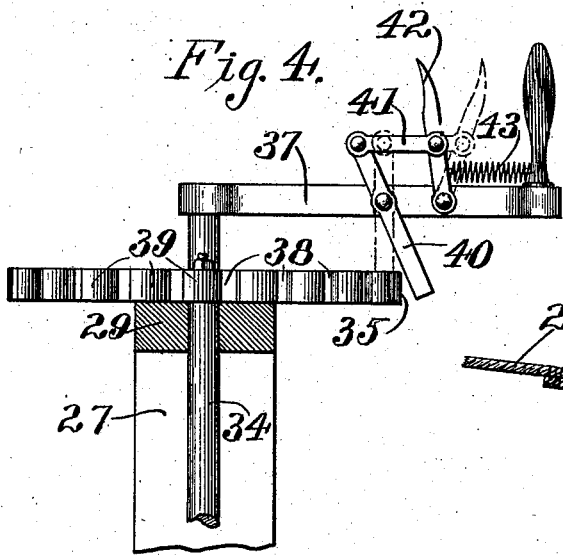
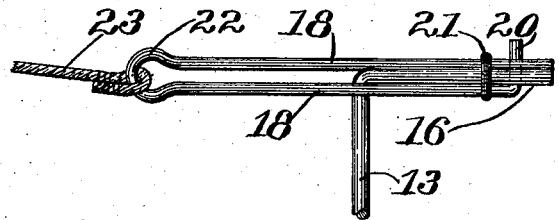
Attest.
Edgar T. Farmer.
M. R. Smith
Inventor:
Owen Wooten
By Rigdon Lougan.
Attys

UNITED STATES PATENT OFFICE.

OWEN WOOTEN, OF PACIFIC, MISSOURI.

HAY-WAGON BRAKE.

No. 894,562.

Specification of Letters Patent.

Patented July 28, 1908.

Application filed August 6, 1907. Serial No. 387,346.

*To all whom it may concern:*

Be it known that I, OWEN WOOTEN, a citizen of the United States, and resident of Pacific, Franklin county, Missouri, have invented certain new and useful Improvements in Hay-Wagon Brakes, of which the following is a specification containing a full, clear, and exact description, reference being had to the accompanying drawings, forming a part hereof.

My invention relates to a hay wagon brake, my object being to construct a simple, easily operated brake particularly adapted for use on hay wagons, and the operating mechanism of which brake is arranged on the ladder or frame at the front of the hay rack, thus providing braking means which is readily accessible from the top of the load of hay.

A further object of my invention is to so apply the operating means of the brake to the ladder as that said ladder can be swung downward onto the bed of the wagon and still be in operative condition.

To the above purposes, my invention consists in certain novel features of construction and arrangement of parts, which will be hereinafter more fully set forth, pointed out in the claims, and illustrated in the accompanying drawings, in which:—

Figure 1:
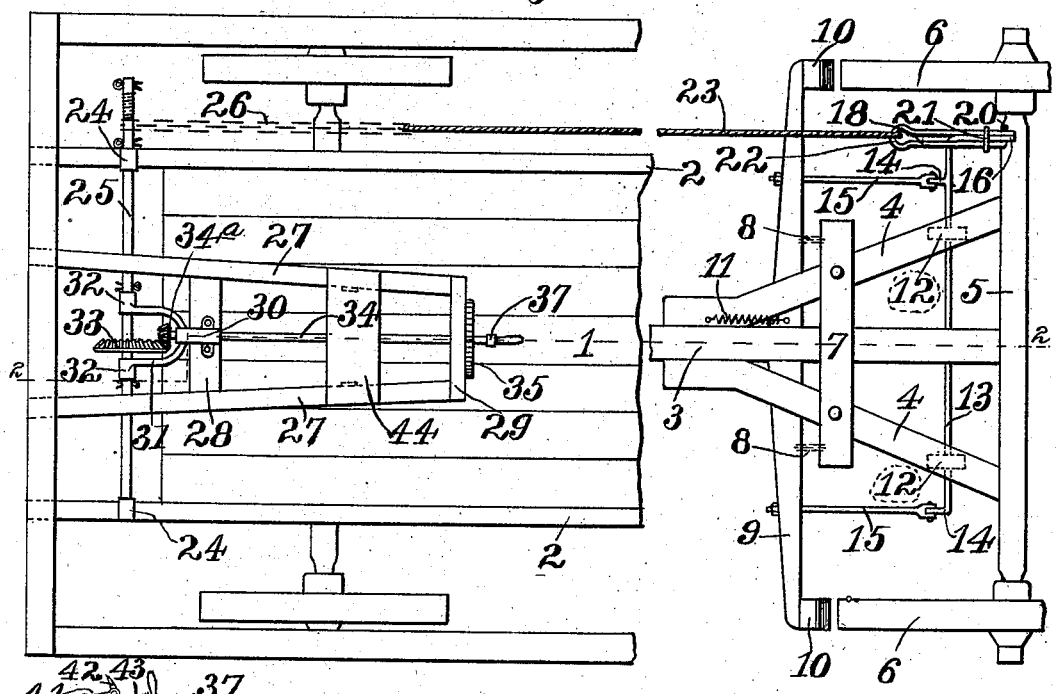
Figure 2:
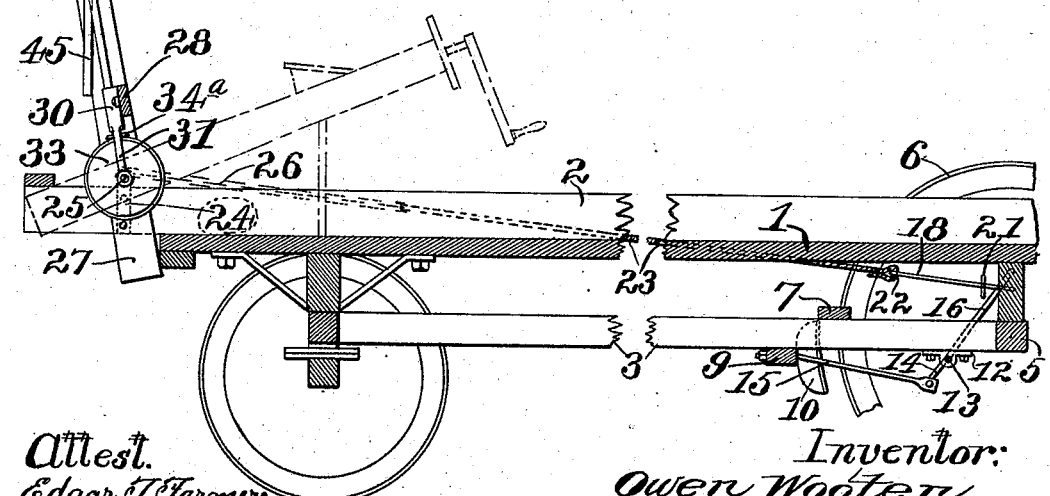

Figure 1 is a plan view of a hay wagon with a portion thereof broken away, and with my improved brake in position on said wagon; Fig. 2 is a section taken on the line 2—2 of Fig. 1, and showing the ladder at the front of the frame elevated; Fig. 3 is a plan view of the upper end of the ladder, and showing a ratchet wheel applied thereto; Fig. 4 is a transverse section taken approximately on the line 4—4 of Fig. 3, and showing the latch on the brake operating handle; Fig. 5 is a detail view of a detachable link used for connecting the cable to the rock shaft of the brake, and which link is open; Fig. 6 is an elevation of the detachable link in a closed position.

Referring by numerals to the accompanying drawings:—1 designates the bed or body of the wagon, 2 the side sills thereof, 3 the reach, 4 the hounds, and 5 the rear axle on the ends of which are arranged the rear wheels 6.

Fixed on top of the hounds 4 is a transverse beam 7, and supported from the ends thereof by short chains 8, or in any suitable manner, is a brake beam 9, on the ends of which are arranged shoes 10, which are adapted to engage the peripheries of the rear wheels. A retractile coil spring 11 is fixed at one end to one of the hounds 4, and at its opposite end to the brake beam 9, the end of which coil spring normally maintains the brake shoes 10 away from the wheels 6.

Journaled in bearings 12 on the under side of the hounds 4 is a rock shaft 13, which is provided with a pair of downwardly projecting arms 14, to the lower ends of which are pivotally connected the rear ends of rods 15, the forward ends of which are connected to the brake beam; and the right hand end of this rock shaft 13 is bent upward, as designated by 16, and provided with an aperture 17. A connecting link comprises a rod or strap 18, of resilient metal bent double, with one end provided with an aperture 19, which is adapted to receive the laterally bent end 20 of the opposite portion of the link; and arranged to slide upon said link is a ring 21, which, when moved toward the free ends of the link, causes the same to move toward one another, with the laterally bent end 20 seated in the aperture 19. This link forms a means of quick attachment or detachment with the upper end of the arm 16, and secured to the loop 22, at the forward end of the link, is the rear end of a cable 23, which extends along the right hand side of the wagon bed 1.

Fixed to the sills 2, adjacent their forward ends, are bearings 24, in which is arranged for rotation a shaft 25, the right hand end of which extends a short distance beyond the right hand bearing; and arranged to wind on said extended end is a chain 26, the rear end of which is connected to the forward end of the cable 23. The shaft 25 passes through the lower ends of the side rails 27 of the ladder at the forward end of the hay frame, which ladder is provided with a transverse bar 28 at a point near its center, and with a transverse top piece 29. Fixed on the transverse bar 28 is a bearing 30, with which is formed integral a yoke 31; and formed integral with said yoke are bearings 32, through which the shaft 25 passes. Fixed on the shaft 25, within the yoke, is a beveled gear wheel 33. Journaled in the bearing 30 is a shaft 34, on the lower end of which, within the yoke 31, is fixed a beveled pinion 34$^a$ which meshes with the beveled gear wheel 33. Fixed on top of the transverse bar 29, at the top of the ladder, is a ratchet wheel 35, in the center of which is formed a bearing 36, through which the upper end of the shaft 34 projects, and fixed on the upper end of said shaft 34 is a crank handle 37.

The edge of the ratchet wheel is provided with a series of notches 38, and within each notch is formed a pair of shoulders 39, the same being arranged on opposite sides of the opening into the notch. Fulcrumed on the handle 37 is a pawl 40, the lower end of which is adapted to engage behind the shoulders 39 in the notches 38; and pivotally connected to the upper end of the pawl 40 is a link 41, the opposite end of which is connected to the trigger 42, which latter is fulcrumed on the handle 37, and there being an expansive coil spring 43 arranged behind said trigger 42. Arranged on the front edges of the side rails 27 of the ladder is a transverse plate 44, which forms a driver's seat when the ladder is swung downward out of use, and pivotally arranged on the inner faces of the side rails 27 are gravity legs 45, which support the ladder when the same is lowered.

The ladder is readily moved from one position to another; and, when in either position, the brake shoes 10 are applied to the rear wheels by engaging the crank handle 37 and rotating the shaft 34, which by means of the beveled pinions 35 and 34ª imparts rotary motion to the shaft 25, thus winding the chain 26 on the extended end of said shaft, in turn rocking the shaft 13, which action pulls the brake beam 9 rearwardly and causes the shoes to engage the rear wheels.

Should it be desired to lock the brake in its set position, the operator pulls the trigger 42, which action throws the lower end of the pawl 40 into one of the notches 38, and said lower end will engage behind one of the pair of shoulders 39 in said notch, thus holding the brake set. When the brake is released by loosening the pawl 40 from the notch in which it has been engaged, the various operating parts of the mechanism will return to their normal positions, owing to the action of the coil spring 11, which returns the brake beam 9 to its normal position. If desired, a sheet metal hood may be provided on the yoke 31 so as to inclose the gearing and prevent the same from becoming clogged with hay.

A brake of my improved construction is easily applied for use, and can be conveniently operated when the ladder is in either elevated or lowered position.

I claim:—

1. The combination with a hay wagon, of a shaft arranged for rotation at the forward end of the wagon frame, a ladder arranged to swing vertically on the shaft, a shaft arranged for rotation in the ladder, a yoke journaled on the center of the first mentioned shaft, a bearing formed in said yoke for the lower end of the shaft in the ladder, meshing beveled pinions on the two shafts within the yoke, a ratchet wheel fixed on top of the ladder, there being oppositely arranged shoulders formed in the notches of the ratchet wheel, a crank handle fixed on top of the shaft carried by the ladder, a pawl carried by said crank handle and adapted to engage behind the shoulders in the notches of the ratchet wheel, a brake beam arranged beneath the rear portion of the wagon frame, brake shoes on the ends of the beam for engaging the rear wheels of the wagon, a crank shaft journaled on the under side of the wagon frame, connections between said crank shaft and the brake beam, and a flexible connection from one end of the crank shaft to the end of the shaft journaled in the forward end of the wagon frame.

2. The combination with a hay wagon, of a brake arranged to engage the rear wheels of said wagon, a shaft journaled for rotation in the forward end of the wagon frame, a flexible connection between the shaft and the brake, a ladder arranged to swing vertically on the shaft, a shaft arranged for rotation in the ladder, a yoke journaled on the center of the first mentioned shaft in the wagon frame, and which yoke is rigidly fixed to the ladder, a bearing formed in the yoke for the lower end of the shaft in the ladder, meshing beveled pinions fixed on the two shafts within the yoke, a ratchet wheel fixed on top of the ladder, there being oppositely arranged shoulders formed in the notches of the ratchet wheel, a crank handle fixed on top of the shaft carried by the ladder, and a pawl carried by said crank handle and adapted to engage behind the shoulders in the notches of the ratchet wheel.

In testimony whereof, I have signed my name to this specification, in presence of two subscribing witnesses.

OWEN WOOTEN.

Witnesses:
A. WERTMEYER,
SYLVESTER TAYLOR.